US009902815B2

(12) United States Patent
Tamminen et al.

(10) Patent No.: US 9,902,815 B2
(45) Date of Patent: Feb. 27, 2018

(54) FUNCTIONALIZED LIGNIN AND METHOD OF PRODUCING THE SAME (71) Applicant: Teknologian tutkimuskeskus VTT, VTT (FI)

(72) Inventors: Tarja Tamminen, Espoo (FI); Jarmo Ropponen, Espoo (FI); Eva-Lena Hult, Espoo (FI); Kristiina Poppius-Levlin, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 33 days.

(21) Appl. No.: 14/348,904

(22) PCT Filed: Oct. 8, 2012

(86) PCT No.: PCT/FI2012/050965
§ 371 (c)(1),
(2) Date: Apr. 1, 2014

(87) PCT Pub. No.: WO2013/050661
PCT Pub. Date: Apr. 11, 2013

(65) Prior Publication Data
US 2014/0243511 A1 Aug. 28, 2014

Related U.S. Application Data (60) Provisional application No. 61/544,303, filed on Oct. 7, 2011.

(51) Int. Cl.
C07G 1/00 (2011.01)
C08H 7/00 (2011.01)
C09D 197/00 (2006.01)
C09J 197/00 (2006.01)
C08L 97/00 (2006.01)
D21H 17/23 (2006.01)

(52) U.S. Cl.
CPC ............... *C08H 6/00* (2013.01); *C07G 1/00* (2013.01); *C08L 97/005* (2013.01); *C09D 197/005* (2013.01); *C09J 197/005* (2013.01); *D21H 17/23* (2013.01)

(58) Field of Classification Search
CPC ...................................................... C07G 1/00
See application file for complete search history.

(56) References Cited

U.S. PATENT DOCUMENTS

| 2,429,102 | A | | 10/1947 | Lewis et al. | |
|---|---|---|---|---|---|
| 3,149,085 | A | | 9/1964 | Ball et al. | |
| 4,017,430 | A | * | 4/1977 | Briggs | 530/502 |
| 5,773,590 | A | * | 6/1998 | Hart | 530/500 |
| 6,172,204 | B1 | * | 1/2001 | Sarkanen et al. | 530/500 |
| 2010/0105798 | A1 | * | 4/2010 | Hasegawa | 522/99 |
| 2010/0152428 | A1 | * | 6/2010 | Gifford et al. | 530/504 |
| 2010/0204368 | A1 | * | 8/2010 | Benko et al. | 524/73 |
| 2010/0331531 | A1 | * | 12/2010 | Mykytka | 530/501 |
| 2011/0263836 | A1 | * | 10/2011 | Vuorenpalo et al. | 530/500 |
| 2012/0012035 | A1 | * | 1/2012 | Blank et al. | 106/802 |

OTHER PUBLICATIONS

Holmbom (Journal of the American Oil Chemists Society, 1977, p. 289-293).*
Stenberg et al. (Surface Coatings International Part B: Coatings Transactions, vol. 88, B2, 83-156, 2005).*
Antonsson, Stefan. The use of lignin derivatives to improve selected paper properties. Licenciate Thesis, Stockholm: Royal Institute of Technology, 2007.

* cited by examiner

Primary Examiner — Liam J Heincer
(74) Attorney, Agent, or Firm — Seppo Laine Oy (57) ABSTRACT In this study, commercially available softwood lignin was esterified with tall oil fatty acid (TOFA) and tested as barrier material in fiber-based packaging material. The modified lignin samples were applied with a bar coater forming an even coating on the paperboard substrate. A significant decrease in WVTR and OTR value was observed for paperboard coated with the modified lignin as well as pure TOFA used as a reference. In contrast to the TOFA coating, the modified lignin coatings exhibited a high and stable contact angle. The coating material did not affect the tensile strength of the paperboard. According to the results, the demonstration of the conversion of lignin into a value added product has been shown. Furthermore, the novel coating material shows promising properties for the development as sustainable barrier material in fiber-based packaging material to replace oil-placed barriers.

11 Claims, 8 Drawing Sheets

Molar mass distributions of TOFA-lignins

FUNCTIONALIZED LIGNIN AND METHOD OF PRODUCING THE SAME

FIELD OF INVENTION

The present invention relates to modification of natural products. In particular the present invention concerns a method of modifying lignin, comprising the step of reacting at least a part of the hydroxyl groups present in the lignin in order to form a derivative thereof.

DESCRIPTION OF RELATED ART

Fiber-based packaging materials have many advantages over their plastic candidates such as renewability, recyclability and compostability. However, their application is restricted due to poor barrier properties and high sensitivity to moisture. In order to improve the barrier properties, packaging material is laminated with aluminium or petroleum based polymers such as PE, EVOH and PVC derivate. Since both the plastic film and the aluminium are problematic for sorting, recycling and recovery, replacing one or more barrier layers thereof in demanding packaging with bio-based polymers should be much desired from an environmental point of view. Examples of bio polymers which have been evaluated for packaging applications are chitosan, hemicelluloses, microfibrillated cellulose and starch. However, many of the bio polymers are hydrophilic and films produced from these materials are often hygroscopic, resulting in partial loss of their barrier properties at high humidity.

Lignin is one of the most abundant natural polymers on earth. Presently lignin is separated from wood during pulping processes. Only a small amount (1-2%) is utilized in speciality products whereas the rest primary serves as fuel. Even if burning lignin is a valuable way to reduce usage of fossil fuel, lignin has significant potential as raw material for the sustainable production of chemicals and materials. Furthermore, in future biorefineries processing lignocellulosic materials with the primary purpose of producing fermentable sugars from cellulose and hemicellulose, will generate lignin in very substantial quantities. Consequently, new avenues open up for lignin utilization.

Lignins differ structurally depending on raw material source and subsequent processing, but one common feature is a backbone consisting of various types of phenyl propan units that are bound to each other via aryl ether or carbon-carbon linkages. They are typically substituted with methoxyl groups and the phenolic and aliphatic hydroxyl groups provide sites for e.g. further functionalization. Lignin is known to have a low ability to sorb water compared to for example the hydrophilic cellulose.

Previous publications demonstrate how lignin containing bio based polymer composites can be used as films for improving the water resistance and to improve gas barrier properties. A suberin like lignin derivate as a coating material on paper was shown to make it hydrophobic (Antonsson et al., 2008). However, technical lignins have typically poor film forming properties.

SUMMARY OF INVENTION

It is an aim of the present technology to improve the properties, in particular mechanical or physical properties, such as film forming properties, of lignins, in particular technical lignins and similar lignin products isolated from annual and perennial plants, such as wood, and isolated from products produced from said plants.

It is another aim to provide functionalized lignin with barrier properties.

It is still a further aim to improve the properties of lignin and, in particular lignin polymers, so as to allow for the use of the material in areas, such as applications relating to insulation, adhesion, binding, as well as composites.

In the present context it has been found that hydroxyl groups present in lignin, preferably aliphatic or aromatic hydroxyl groups, can be esterified with mixtures of fatty acids, such as a mixture of natural fatty acids. In particular, the hydroxyl groups of lignin can be esterified with a mixture of fatty acids containing C16 to C20 unsaturated fatty acids. Suitable compositions are formed by Tall Oil Fatty Acid fraction or similar compositions.

Esterification is carried out in order to completely or partially esterify the hydroxyl groups to provide a modified lignin product which has interesting properties.

Thus, modification of lignin with fatty acids improves the film forming ability of lignin and the barrier properties of the film.

More specifically, the method according to the present invention is characterized by what is stated in the characterizing part of claim 1.

The modified lignin according to the invention is characterized by what is stated in the characterizing portion of claim 12.

Advantageous Effects of Invention

The present invention provides considerable advantages. Thus, as shown in the below examples, TOFA-esterified lignin forms a film with high and stable contact angle on paper board. It has good barrier properties against oxygen and water vapour and medium barrier properties for aromas.

The active multiple double bond functionalities in TOFA enable further tailoring of the film properties.

Both lignin and TOFA are available from kraft pulping side streams, and their exploitation via the described invention e.g. in fiber-based packaging industry improves the competitiveness of the forestry section as a whole.

Naturally, the source of lignin raw material may be other than the kraft process, for example the lignin can be sourced from soda cooking, from polysulphide cooking and from various organosolv processes, for example organosolv incorporating peroxo compounds Other applications than the film barrier can be found in the field of construction (insulation foams), adhesives, binders and composites, to mention merely a few examples.

DESCRIPTION OF EMBODIMENTS

In the present technology lignin is subjected to chemical functionalization in order to form a lignin derivative having improved mechanical and physical properties. In particular, chemical functionalization of lignin by forming ester derivatives, as disclosed herein, provides an interesting route to lower the glass transition point of lignin, increase its thermoplasticity and achieve even films.

In the present technology, lignin is functionalized with a mixture of natural fatty acids. Preferably lignin is functionalized with Tall Oil Fatty Acid (TOFA).

TOFA is obtained from crude tall oil (CTO), a co-product of the pulping process. CTO contains a mixture of fatty acids, rosin acid and unsaponifiables, and TOFA is prepared by separating the fatty acids from the other components by distillation and by recovering the fatty acid rich fraction.

In one preferred embodiment, the hydroxyl groups of the lignin raw-material are esterified with unsaturated fatty acids, which make up 80 to 99%, preferably 85 to 99%, by mass of the fatty acid composition used, which optionally contains saturated fatty acids, rosin acids and unsaponifiable in addition to the unsaturated fatty acids.

Depending on the content of minor components, such as saturated fatty acids, rosin and unsaponifiables, several different grades of TOFA are commercially available. Generally tall oil fatty acids (TOFA) contain 85% or more fatty acids and 15% or less of rosin, calculated by weight of the total mass (dry weight portion).

Preferably, the content of the rosin acids in the fatty acid composition is about 0.1 to 10%, and the content of unsaponifiables is less than 5%. Particularly preferred are compositions in which the total content of rosin acids and unsaponifiables is 5% or less.

The fatty acids of TOFA typically contain 16 to 18 carbon atoms, the main components being unsaturated fatty acids, such as oleic and linoleic acids, having 1 and 2 double bonds (i.e. C18:1 and C18:2 acids, 18 carbon atoms, one and two double bonds), and linolenic and pinolenic acid, having three double bonds (i.e. C18:3 acids).

Typically, of the fatty acids, the C18:3 fatty acids form up to 10%, whereas the main components are the fatty acids containing one and two double bonds. Typically, the content of C18:2 fatty acids is 20 to 70 parts by weight and the content of the C18:1 fatty acids is 20 to 70 parts by weight. In one specific example, a TOFA contains roughly 95 to 98% fatty acids, and 2 to 5% in total of saturated fatty acids and rosin acid and unsaponifiables. Of the total content of fatty acids, about 30 to 70% are C18:2 fatty acids and 40 to 60% are C18:1 fatty acids.

Although the present disclosure primarily relates to TOFA compositions, it should be noted that similar compositions of fatty acids, in particular natural fatty acids, are derivable also from materials of vegetable and animal origin. Thus, suitable fatty acid compositions can be obtained from various sources, such as rapeseed, linseed, hempseed oil, from soya bean, sunflower, colza, canola and olive oil; from mustard, palm, peanut, castor and coconut oil. Also oils from fish and seaweeds are in principle useful in the present context.

It may be necessary to submit said fatty acid sources to various treatment steps, including separation processing for example by distillation, in order to increase the ratio or purity of the fatty acid fractions.

According to the present technology, the acids, primarily fatty acids, and in particular unsaturated fatty acids, of the fatty acid feedstock, such as TOFA, are covalently linked to commercially available lignin via esterification to different degree of substitution.

Lignin contains hydroxyl groups, such as phenolic hydroxyl groups, which can be esterified. Also aliphatic hydroxyl groups can be esterified by the present technology.

The chemical nature of any lignin obtained from wood processing is affected by (i) the lignocellulosic source and (ii) the way the fibers of the source have been processed.

The lignin raw-material preferably comprises isolated lignin. It may also comprise lignin present in an aqueous stream.

Lignins are composed of three different types of phenylpropane units, i.e. p-hydroxyphenyl (H) guaiacyl (G), and syringyl (S) groups. Lignins isolated from softwood (e.g. pine and spruce) contains mainly G units, whereas lignins isolated from hardwoods (e.g. eucalypt and birch) contain both G and S units in different proportions.

Processing of lignocellulosic fibers by pulping or bioethanol processing affects the chemical composition of the lignin. Thus, it is assumed that lignin may be fractionated into smaller physical units according to their functionality, i.e. guaiacyl, syringyl, condensed, and oxidized groups, as well as by surface area, with varying functionalities. However, this heterogeneity of isolated lignin is probably the most significant challenge currently limiting its application in a wide range of value-added products. Isolated fractions of processed lignins can be expected to be more homogeneous in character, typically having distinct molecular mass distributions and chemical group functionalities.

Esterification of lignin can be carried out with the above disclosed composition by a number of esterification processes known per se. The reaction can be carried out in a liquid medium or in dry phase. Examples of suitable method include transesterfication, esterification using reactive derivatives of the acid groups (e.g. acid anhydrides, acid chlorides), catalyzed direct esterification and the use of a screw reactor to avoid the use of a solvent.

Esterification is generally carried out at a temperature between the melting point and boiling points of the liquid medium, in particular at 0 to 100° C. when operating in water at ambient pressure. Depending on the reactants a temperature of 0 to 50° C. can be particularly advantageous.

Conventional acid or alkaline catalysts can be employed.

In one embodiment, esterification is carried in ambient atmosphere, for example in the presence of air. In another, preferred embodiment, esterification is carried out in the presence of a reduced concentration of oxygen in regard to normal air. Preferably, the latter embodiment is carried out at a oxygen concentration in the atmosphere of less than 10 vol-%, in particular less than 5 vol-%, advantageously less than 1 vol-%. Oxygen concentrations of 0.1 to 0.0001 vol-% are suitable.

The atmosphere can comprise inert gases. One example is nitrogen atmosphere essentially free from oxygen.

It is also possible to carry out the esterification at reduced pressure, e.g. a pressure of 0.0001 to 0.1 Bar absolute pressure.

The lignin esters are isolated from the reaction mixtures are purified for example by washing and then dried.

In the laboratory experiment discussed below, TOFA is converted into the corresponding fatty acid chloride mixture and further reacted with lignin. In this reaction, the aliphatic and phenolic hydroxyl groups in lignin are esterified with the fatty acid components of TOFA. The extent of reaction can be adjusted by the ratio of lignin and TOFA Summarizing the above, the present technology comprises in one embodiment modifying lignin by esterifying at least a part of the hydroxyl groups present in the lignin with a tall oil fatty acid composition.

In a first alternative of the above embodiment, the method comprises esterifying at least a part of the hydroxyl groups present in lignin with acids present in a tall oil fatty acid fraction (TOFA).

The hydroxyl groups are preferably esterified with fatty acids and optionally rosin acids.

At least a part of the acids used for esterification contain unsaturation, preferably the fatty acids, and optionally rosin acids, used for esterification contain single or multiple double bonds. Thus, the composition comprises $C_{16}$ to $C_{20}$ fatty acids, for example $C_{18}$ fatty acids, at least a part of which are formed by fatty acids containing 2 or 3 double bonds.

The lignin to be treated comprises phenolic hydroxyl groups, aliphatic hydroxyl groups or a combination thereof, in particular the hydroxyl groups comprise syringyl, guaiacyl or similar groups.

By the present method, at least 50%, preferably 60 to 100% of the hydroxyl groups are substituted or esterified.

The active multiple double bond functionalities in TOFA enable further tailoring of the film properties.

Both lignin and TOFA are available from kraft pulping side streams, and their exploitation via the described invention e.g. in fiber-based packaging industry would improve the competitiveness of the forestry section as a whole. More generally, the source of lignin raw material may be other than kraft process.

As discussed above, the present technology allows for the use of other suitable sources for the fatty acid components, including other vegetable oils, such as the ones listed above. Thus, for the purpose of esterifying lignin according to the present technology typically any C16-C20 fatty acid composition can be employed, in particular compositions comprising a significant portion of unsaturated C18 fatty acids. Thus, a fatty acid composition suitable for use in the present technology (irrespective of origin) preferably contains at least 80%, preferably at least 85% and up to 99% by mass, of the total solid matter, of fatty acids having 18 carbon atoms, 90 to 100% by mass of said fatty acids being in unsaturated C18 fatty acids.

Of the fatty acid composition, C18:2 fatty acids make up 30 to 60 parts by weight and the content of the C18:1 fatty acids is 30 to 60 parts by weight.

Fatty acid esterified lignin forms a film with high and stable contact angle on paper board. It has good barrier properties against oxygen and water vapour and medium barrier properties for aromas.

Other applications than the film barrier may be found in the field of construction (insulation foams), adhesives, binders and composites as examples.

The plasticity of lignin can be increased by suitable additives in the formulation. However, the covalent link between lignin and the additive prevents diffusion phenomena and thus stabilize the product. Fatty acids have been linked to lignin before. However, the idea to use TOFA as fatty acid source is novel.

As such, TOFA applied on paper board gives high contact angle, good barrier properties against oxygen and water vapour but poor barrier properties for aromas.

TOFA-esterified lignin can be compounded at low temperature (80° C.) without added plasticizers.

Using the present products, coating of substrates can be carried out either from solution phase or emulsion phase or by extrusion coating. As the below test results show, when using PLA (poly(lactic acid)) as a reference, it can be seen that lignin modified by a mixture of fatty acids of the present kind, e.g. a "TOFA-lignin" exhibits at least as good results for resistance against water vapour transmission (WVTR) as the extrusion processed PLA reference. So far PLA is the only commercially available biopolymer which has been used for barrier applications. In comparison to PLA, one important advantage of the present products is that they are obtained from a non-food/inedible feedstock.

The following examples illustrate the invention. They are not to be construed as limiting on the scope. In particular is should be noted that although the results have been obtained using TOFA, a mixture of fatty acids, in particular of natural fatty acids, a part of which are unsaturated, for functionalization of lignin, there are other sources which will provide similar fatty acid mixtures and which are useful for modifying lignin.

Materials and Methods
Synthesis and Characterization of the TOFA Functionalized Lignin
Materials for Synthesis The Indulin AT, (softwood kraft lignin) was received from MeadWestvaco, USA. TOFA was a gift from Forchem (Rauma, Finland). Chloroform, ≥99.5%, triethyl amine, ≥98% and dimethylformamide, ≥99.8% were purchased from Fluka. Thionyl chloride, ≥99% was obtained from Aldrich and dichlomethane, HPLC grade was from Rathburn. All used chemicals and solvents in this research were used as received.

TOFA Acid Chloride

TOFA (50.0 g) was placed in a three neck flask together with $CH_2Cl_2$ (100 ml) and DMF (catalytic amount). Thionyl chloride $SOCl_2$ (42.4 g, 357 mmol) was added slowly to the mixture and stirred 2 h at 40° C. Excess of $SOCl_2$ was evaporated and the residue was stripped three times with $CHCl_3$ to give brown oil in quantitative yield.

$^1$H NMR (500 MHz, $CDCl_3$) δ 0.86-0.90 (m, 3H, —$CH_3$), 1.26-1.38 (m, 16H, —$CH_2$), 1.67-1.80 (m, 2H, —$CH_2$), 1.97-2.17 (m, 4H, —$CH_2$), 2.75-2.90 (m, 3H, —$CH_2$), 5.29-5.40 (m, 3H, —CH=CH—).

$^{13}$C NMR (125 MHz, $CDCl_3$) δ 14.0 ($CH_3$), 22.5-31.8 ($CH_2$), 47.0 (—$CH_2COCl$), 127.7-130.2 (—CH=CH—), 173.6 (CO).

TOFA-L-100

Lignin (Indulin AT) (8.00 g, 58.6 mmol-OH based on total OH group content of 7.33 mmol/g determined by $^{31}$P NMR analysis) was dissolved in 150 ml of DMF and triethyl amine (11.9 g, 117 mmol). The mixture was cooled to 0° C. and TOFA acid chloride (19.3 g, 64.5 mmol) was added slowly. The mixture was stirred at room temperature over night, poured to 750 ml of water and extracted with $CH_2Cl_2$ (4*100 ml). Organic phases were combined, dried with $Na_2SO_4$ and solvent was evaporated. Residue was dried in vacuo to produce dark brown viscous oil. Yield 17.1 g.

TOFA-L-50

Lignin (Indulin AT) (15.00 g, 7.33 mmol/g OH-group content as above) was dissolved to 150 ml of DMF and triethyl amine (11.1 g, 110 mmol). Mixture was cooled to 0° C. and acid chloride of TOFA (16.4 g, 55.0 mmol) was added slowly. Then mixtures were stirred at room temperature over night, poured to 700 ml of water and extracted with $CH_2Cl_2$ (5*100 ml). Organic phases were combined, dried with $Na_2SO_4$ and solvent was evaporated. Residue was dried in vacuo to produce dark brown viscous oil. Yield 22.3 g.

Size Exclusion Chromatography

Relative molecular weights (SEC) were analysed using THF as a mobile phase at 1 ml/min at room temperature, on HP series 1050 high pressure liquid chromatograph equipment and using Waters Styragel RH4E column. For detection, HP 1047A RI detector and UV 280 nm were used. Molar mass calibration was done by polystyrenes with $M_w$ ranging from 680 to 114 000 Da.

Differential Scanning Calorimetry DSC

Differential scanning calorimetry (DSC) measurements were carried out with the Mettler Toledo Differential Scanning calorimeter model DSC820 system STAR$^e$ SW 9.20, Mettler Toledo GmbH, Switzerland under flowing nitrogen (flow rate 50 ml min$^{-1}$) using 40 µl sealed aluminium crucibles that have been pre-treated at 500° C. to oxidize the surface and make it inert.

$^{31}$P Nuclear Magnetic Resonance

Samples were phosphitylated according to literature method (Granata and Argyropoulos, 1995). Freshly prepared samples were measured with $^{31}$P NMR immediately after preparation at room temperature. Spectra were measured on a Varian Mercury-VX 300 MHz and compiled from 512 transients using 5 second pulse delay for 90° pulse. The chemical shift scale was calibrated on the signal for phosphitylated water (132.2 ppm).

FTIR

Fourier transform infrared Spectroscopy (FTIR) measurements were performed using a Bruker Equinox 55 spectrometer (Ettlingen, Germany) with an ATR sampling accessory.

Pyrolysis-Gas Chromatography (GC)-Mass Spectrometry (MS)

An aqueous solution of tetramethylammonium hydroxide TMAH (10% w/w aqueous solution, Merck) was used as a methylation reagent. Heneicosanoic acid was used as an internal standard (Fluka; purm≥98%)

The pyrolysis was performed with a platinum foil pulse pyrolyzer (Pyrolab2000® from Pyrolab, Sweden) connected to a gas chromatography-mass spectrometry (Varian 3800 GC-Varian 2000 MS), using a fused silica capillary column (J&W, DB-1701, 30 m×0.25 mm, film thickness 1 µm). About 50 µg of the sample was weighed accurately and transferred to the foil. Before addition of reagent an internal standard solution was added on the sample. The methylation reagent, 3-4 µl, was added and mixed with the sample. The sample mixed with reagent was inserted in the pyrolyzer maintained at 175° C. The pyrolysis was carried out at 600 at 2 s. The degradation products were led into capillary column for separation using helium as carrier gas, flow rate 1.0 ml min$^{-1}$. The column temperature was programmed from 80° C. (2 min) to 160° C. for 8° C. min$^{-1}$ extended from 160° C. to 280° C. for 5° C. min$^{-1}$. The final temperature was held for 15 min. The mass spectrometer was operated in EI mode (70 eV). Quantification of fatty acids was based on the internal standard calibration.

Materials for Coating, Coating Procedure and Characterization

Board Sample for Coating

Commercial paperboard with a basis weight of 200 g/m$^2$ was used. One side of the provided paperboard had a double coating.

Coating Procedure

The TOFA modified lignin samples were diluted in acetone to 17 w/w % and the TOFA reference coating with a coat weight of 5.0 g/m2 was diluted with acetone to 50 w/w %. An Erichsen coater with a wire diameter of 40 µm was used to coat the paperboard. The application rate was 12 mm/s. The samples were applied either as a single or double coating layer on the double coated paperboard.

Coat Weight

The coat weight was determined using a Mettler HK 160 balance. The samples were conditioned at 23° C. and 50% relative humidity for 4 hours prior to weighing.

Field Emission Scanning Electron Microscopy

The coat surface was characterized by Field Emission Scanning Electron Microscopy (FE-SEM; Zeiss (now LEP) DSM 982) operated at 0.6 and 1.0 kV with magnifications of 1000 and 10000.

Tensile Strength

All samples were conditioned and tested at 23° C. and 50% relative humidity prior to measurements. The tensile strength was measured on a L&W tensile strength tester (Lorentzen and Wettre Oy) according to ISO 1924-2:2008.

Oxygen Transmission Rate

The oxygen transmission rate (OTR) was determined with Oxygen Permeation Analyser Model 8001 (Systech Instruments Ltd., UK) according to the standard ASTM F2622-08 on an exposed surface area of 5 cm$^2$. The tests were carried out at 23° C. and 50% relative humidity. The oxygen transmission rate was expressed as cm$^3$ m$^{-2}$ 24 h$^{-1}$.

Water Vapour Transmission Rate

The Water Vapour Transmission Rate (WVTR) measurements were determined gravimetrically according to a modified ASTM E-96 procedure. Samples with a test area of 30.2 cm$^2$ were mounted on a circular aluminium dish (H. A. Buechel V/H, A.v.d. Korput, Baarn-Holland 45M-141), which contained water. The dishes were stored at 23° C. and 50% relative humidity and weighed periodically until a constant weight reduction was achieved.

Contact Angle

Contact angles of 5 µl water droplets on the coatings were measured at 23° C. and 50% relative humidity using a CAM 200 apparatus (KSV Instruments Ltd). Five measurements on different positions of the film surface were made and the average was determined.

Results:

Characterization of the TOFA Functionalized Lignin

SEC, 31P Nuclear Magnetic Resonance and FTIR

Figure 1:
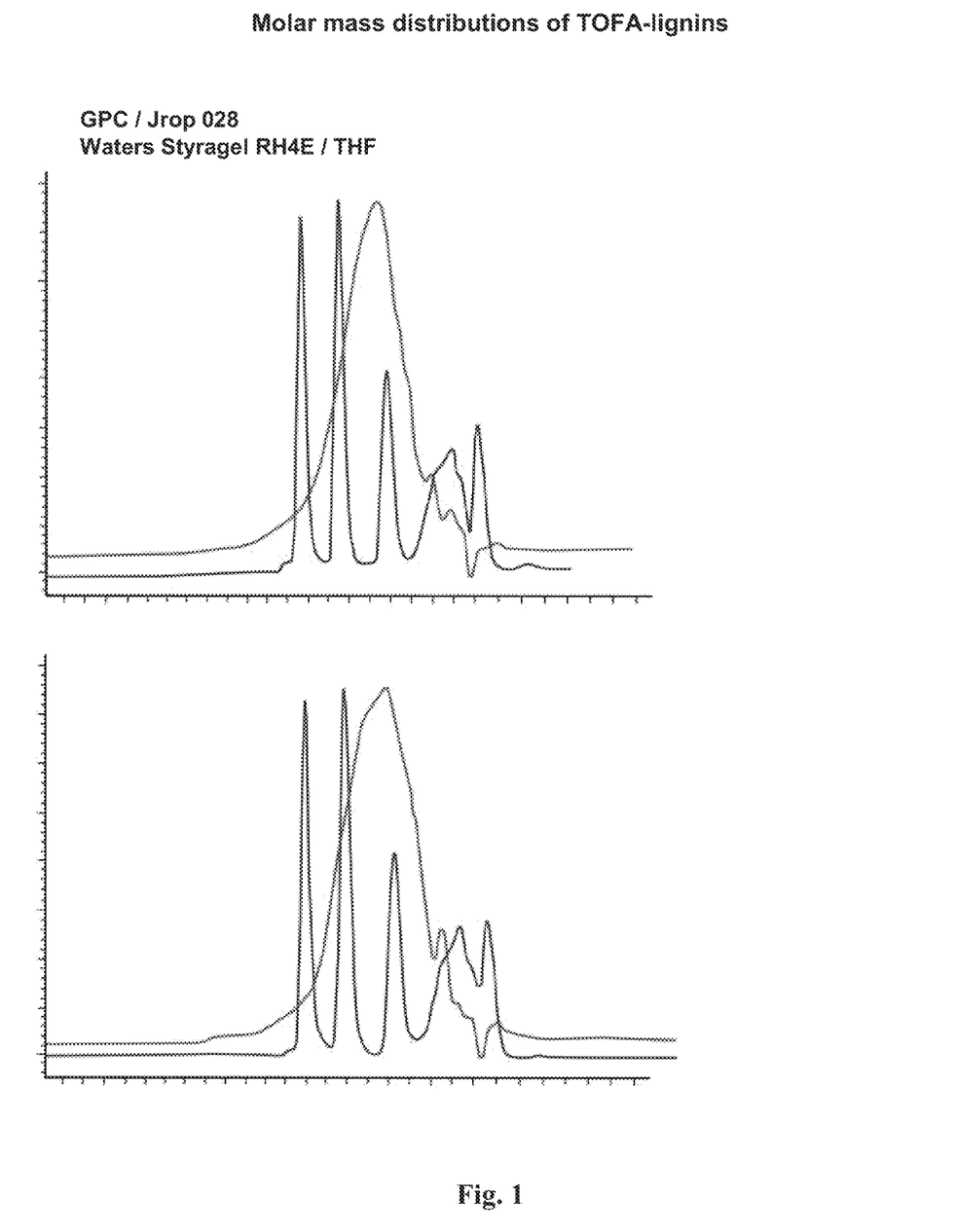
FIG. 1 shows SEC elution peaks for TOFA-L-100 (molar mass distributions of TOFA-lignins)

The SEC results can only be compared between the modified samples, since the starting material was not soluble in the solvent used in SEC. When comparing the molecular masses, the TOFA-L-50 is 58% modified compared to TOFA-L-100 and this is in good agreement with the theoretical results. The elution curves are shown in FIG. 1. They indicate that the molecular weight distributions are rather narrow in both cases (50%).

Furthermore, $^{31}$P NMR shows clear evidence that all hydroxyl groups in TOFA-L-100 are fully modified (results are indicated in slightly different fashion in Tables 1A and 1B):

TABLE 1A

Contents of functional groups (mmol/g) as determined by $^{31}$P NMR

| Sample | Aliphatic OH | Phenolic OH | Carboxylic acid | Ratio Phen OH/ aliph OH | Total |
|---|---|---|---|---|---|
| Indulin AT | 2.83 | 4.50 | 0.34 | 3.53 | 7.66 |
| TOFA-L-100 | 0 | 0 | 0.96 | — | 0.96 |
| TOFA-L-50 | 0.67 | 0.68 | 0.50 | 1.01 | 1.85 |

TABLE 1B

Mmol/g hydroxyl groups

| | Aliphatic OH | Aromatic OH | S + C | G | H | Carboxylic acid | Total OH |
|---|---|---|---|---|---|---|---|
| 100% substitution | 0 | 0 | 0 | 0 | 0 | 0.96 | 0.96 |
| 50% substitution | 0.67 | 0.68 | 0.26 | 0.42 | 0 | 0.50 | 1.85 |

Aromatic hydroxyls: S + C = Syringyl + Condensed, G = Guaiacyl, H = p-Hydroxyphenyl As will appear, practically all aliphatic and phenolic hydroxyl groups were substituted when aiming at complete substitution. Lower charge of TOFA left part of the hydroxyl intact.

Only the amount of hydroxyls from carboxylic acid is increased from a value of 0.34 mmol/g to 0.96 mmol/g which suggests that the sample contains 0.62 mmol/g excess of free TOFA. The 0.62 mmol/g increase in carboxylic hydroxyls means that TOFA-L-100 sample includes roughly 1% free acid which is below detection limit of FTIR and therefore free TOFA is not obtained by FTIR. For TOFA-L-50, the $^{31}$P NMR showed that 75% of hydroxyl groups were esterified, which is slightly higher value than the 58% determined by TMAH thermochemolysis GC-MS and the theoretical 51%. The reason for the higher value than theoretical level of substitution is probably the heterogeneity of the reaction mixture, which enables the enrichment of the hydrophobic, more highly modified material into the organic phase during extractions. In addition, based on the decreased ratio between phenolic and aliphatic hydroxyl groups in esterification, the phenolic hydroxyl groups seem to react preferentially. Also for TOFA-L-50 was obtained small increase in carboxylic hydroxyls based on $^{31}$P NMR, but calculated value for free TOFA (0.3%) is too small to affect barrier properties.

The total amount of fatty acid was investigated by in situ methylation pyrolysis (Table 2).

TABLE 2

Total amount of fatty acids (mg kg$^{-1}$). Standard deviation percentage of parallel measurements is in brackets

| Samples | Total amount of fatty acids mg kg$^{-1}$ (STDV %) |
|---|---|
| TOFA_L_50 | 280 (10) |
| TOFA_L_100 | 480 (15) |
| Indulin AT | 5 (11) |

Figure 2:
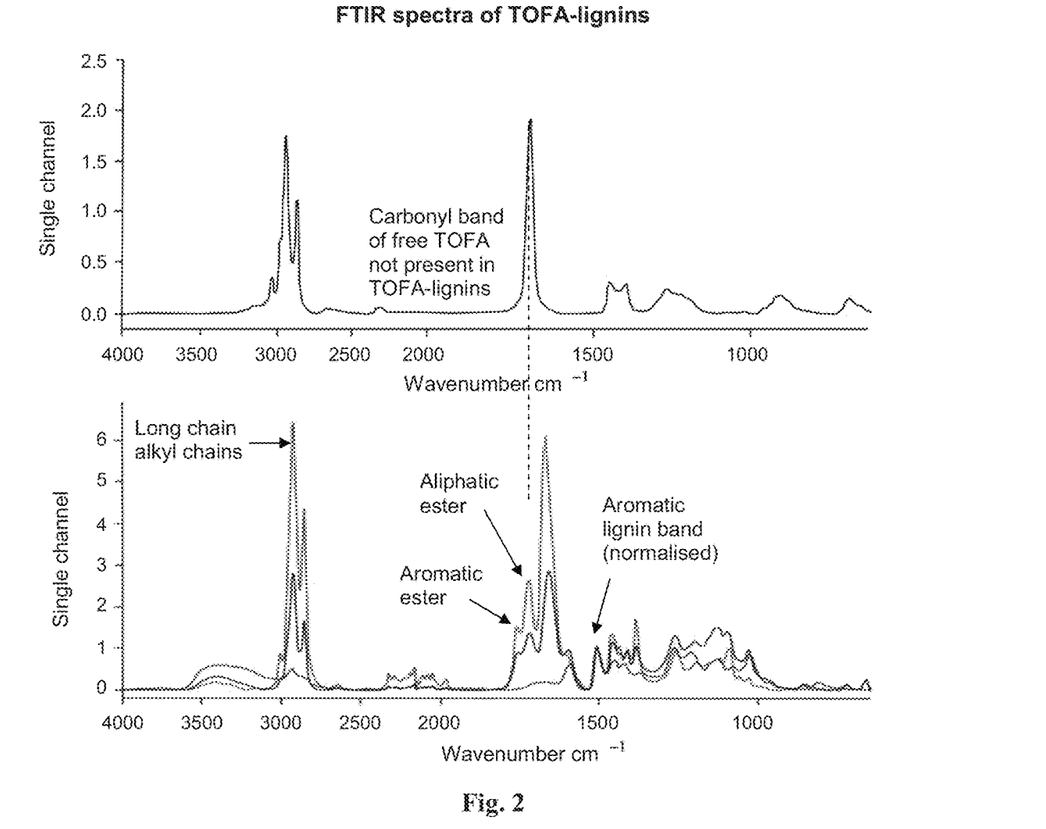
FIG. 2 shows FTIR spectra of the a) TOFA and b) soft wood (SW) kraft lignin (blue line), TOFA_L_50 (50% target degree of substitution by TOFA in SW kraft lignin) (black line) and TOFA_L_100 (100% target degree of substitution by TOFA in SW kraft lignin) (red line), normalised to the aromatic lignin band at about 1510 cm$^{-1}$.

The structural composition of TOFA, lignin and TOFA functionalized lignin was verified with FTIR (ATR mode) and the spectra are shown in FIG. 2.

The peaks at 2925 cm$^{-1}$ and 2854 cm$^{-1}$ are assigned to long chain alkyl groups (aliphatic carbon) and are clearly present in the TOFA and TOFA functionalized lignin samples. The peaks at 1599 cm$^{-1}$, 1508 cm$^{-1}$ and 1451 cm$^{-1}$ are specific for lignin and also for the TOFA modified lignins and are assigned to the aromatic skeletal vibrations. In the TOFA there is also the carbonyl group at 1706 cm$^{-1}$ present. In the TOFA modified lignin samples the appearance of two new peaks at 1739 cm$^{-1}$ and 1762 cm$^{-1}$ is seen. They are assigned to aliphatic ester bond and phenolic ester bond, respectively and indicate esterification of lignin and TOFA.

Both TOFA-L-100 and TOFA-L-50 showed $T_g$ at much lower temperature compared to Indulin AT as such (FIG. 2). TOFA-L-100 showed $T_g$ below 0° C., first can be obtained a relaxation peak and right after $T_g$ release peak. Due this, $\Delta C_p$ value is so small for TOFA-L-100. In addition, phenomenon after 170 is caused most probably due the degradation. For TOFA-L-50 obtained $T_g$ is very wide-ranging starting circa −30° C. and ending over 50° C. This broad glass transition temperature causes also small $\Delta C_p$. In addition, weak $\Delta C_p$ change around 80° C. is also obtained. The broad $T_g$ and also small $\Delta C_p$ change at 80° C. might be caused by heterogeneity of TOFA-L-50 based on different substitution levels.

Figure 3:
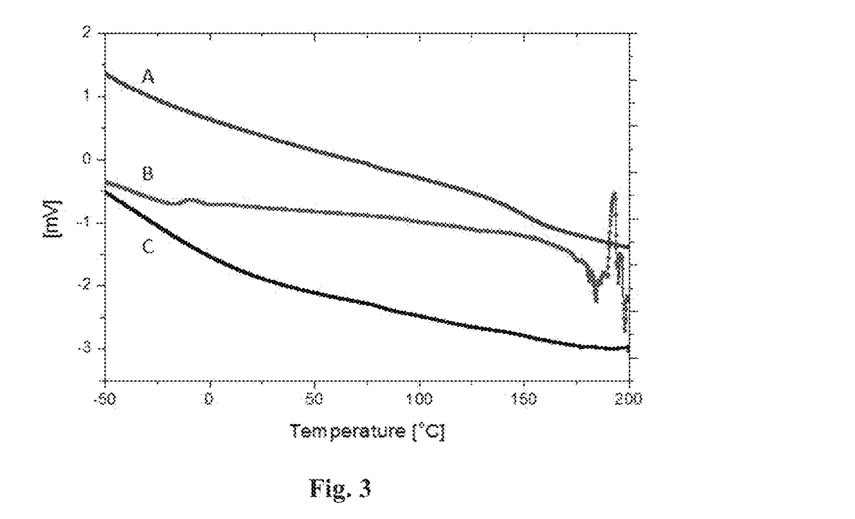
FIG. 3 shows the result of a differential scanning calorimetry (DSC) analysis of TOFA esterified lignin with graphs A representing SW-lignin, B representing TOFA-L-100 and C representing TOFA-L-50.

FIG. 3 shows the results of Differential Scanning calorimetry (DSC) analysis of TOFA esterified lignin. A) SW-lignin, B) TOFA-L-100 and C) TOFA-L-50 using the instruments mentioned above.

The samples were heated and cooled twice at the rate of 10° C./min from −60° C. to 200° C. An appropriate amount of sample (ca. 5-10 mg) is weighed into a weighed pan. The pans were closed by cold-pressing. Holes were punctured into the lid to release any pressure forming in the pan due to temperature increase or evaporation of solvents. Calibration of the DSC was carried out using the melting temperatures and enthalpies of hexane, water, indium, and zinc at heating rates of 2, 5, 10, and 20 K/min. The glass transition temperatures were determined from the midpoint.

Characterization of Paper Board Coated with TOFA Functionalized Lignin

Water Vapour Transmission Rate and Contact Angle

The ability of the TOFA modified lignin and TOFA to act as a moisture barrier was investigated by determining the WVTR. A significant decrease in WVTR was observed for the TOFA modified lignin samples and the TOFA coated paperboard compared to the reference paperboard sample (Table 3).

Table 3 shows oxygen (OTR) and water vapour transmission rates (WVTR) of TOFA and TOFA-functionalized lignin (single coat layer)

TABLE 3

Oxygen (OTR) and water vapour transmission rates (WVTR) of TOFA and TOFA-functionalized lignin (single coat layer)

| Sample | Coat weight (g/m$^2$) | WVTR (g/m$^2$ × 24 h) | OTR (cm$^3$/m$^2$ × 24 h) |
|---|---|---|---|
| Paperboard | — | 840 | >400,000 |
| TOFA | 5.0 (±2.8) | 190 | 10,200 |
| TOFA | 11.4 (±3.5) | 210 | 1,280 |
| TOFA_L_50 | 9.8 (±2.6) | 540 | 41,500 |
| TOFA_L_100 | 2.2 (±0.8) | 500 | 37,600 |
| TOFA_L_100 | 3.9 (±1.0) f) | 280 | 23,500 | f) double coating

Note: The samples were conditioned prior to measurements at 23° C. and 50% RH. The wet cup method was used to determine the WVTR.

Both TOFA-lignin samples act as good oxygen and water vapour barriers; TOFA as such is however even better.

Figure 4:
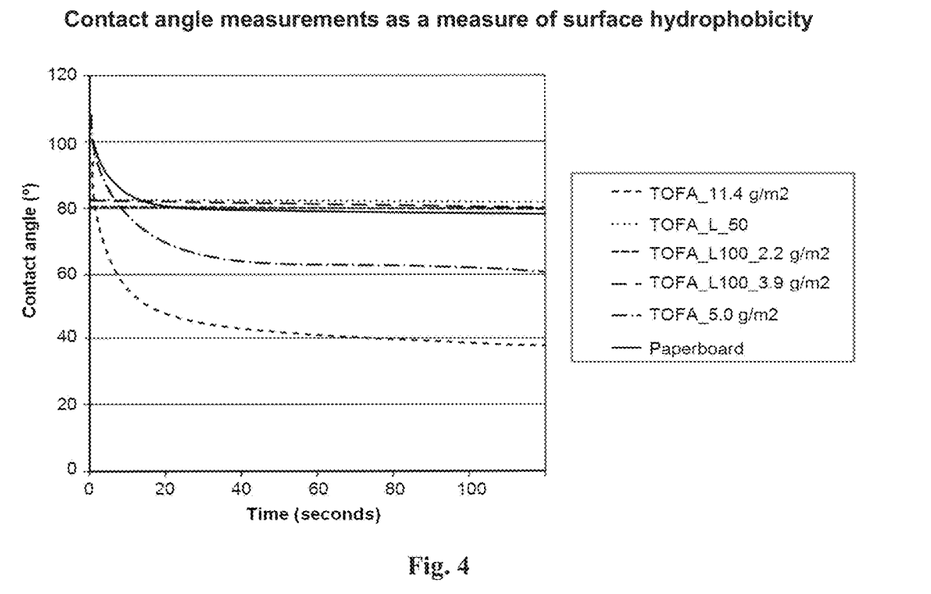
FIG. 4 shows the change in contact angle with time of the paperboard and the coated paperboard samples (contact angle measurements as a measure of surface hydrophobicity)

Furthermore, the contact angle was determined in order to quantitatively measure the wettability of the coating by water. The change in contact angle with time of a water droplet placed on the coatings was monitored and the results are shown in FIG. 4.

All the studied coatings (TOFA_L_50 and TOFA_L_100) except the TOFA coatings exhibited a high and constant (for two minutes) contact angle. It is possible that the surface structure as such and also that the surface chemistry of the TOFA functionalized lignin coatings are different compared to the TOFA coatings thus showing a high and stable contact angle.

The results show that coating paperboard with either TOFA modified lignin or TOFA decreases its water vapour transmission rate and that a high and stable contact angle is achieved. These two observations demonstrate that this application can be an efficient route to extend the application of paper based materials in packaging materials.

Oxygen Transmission Rate

The OTR values of the paperboard (reference), paperboard coated with TOFA and TOFA functionalized lignin are shown in Table 3. The OTR values decrease significantly with the application of a coating layer of TOFA or TOFA functionalized lignin. It seems as if the TOFA coating is able to provide better oxygen barrier compared to the TOFA functionalized lignin coatings at similar coat weights (Table 3).

Both a thicker coat layer (TOFA only) and a double coating of TOFA_L_100 resulted in even lower OTR values.

on the nanometer scale, it permits the passage of oxygen molecules which have a van der Waals diameter of about 0.3 nm, thereby influencing the OTR value.

Figure 6A:
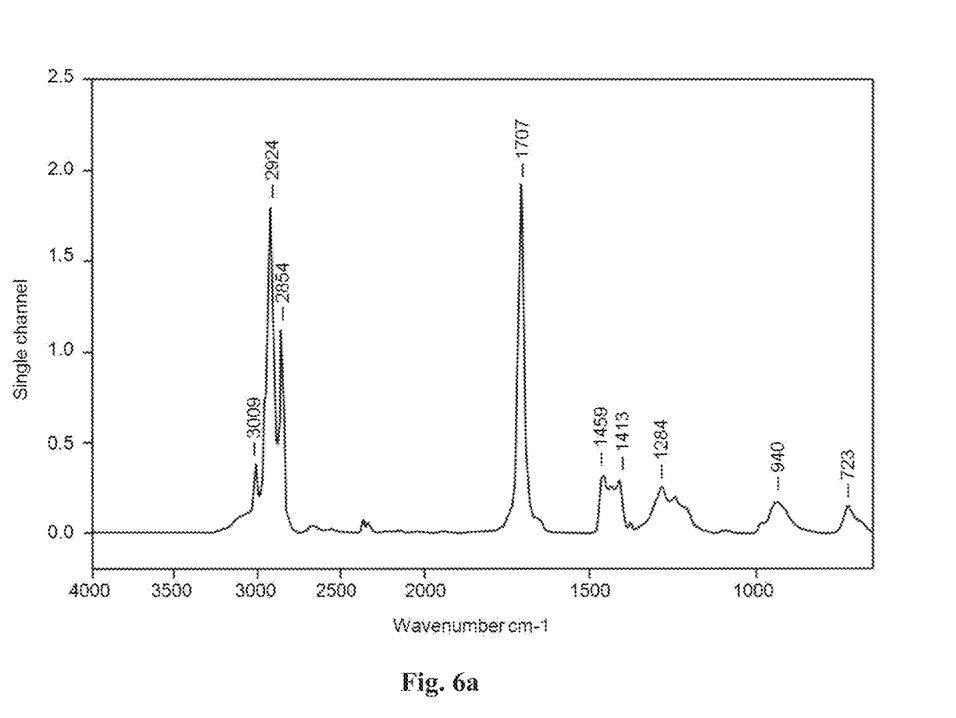
FIG. 6 shows Molar mass distributions of TOFA-lignins.
Figure 6B:
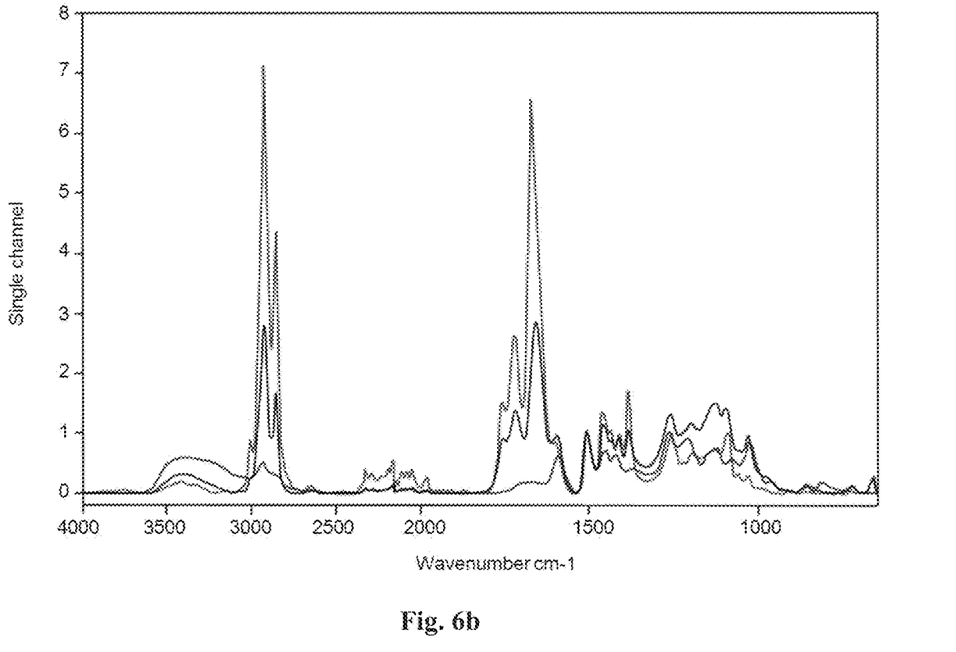

FIG. 6 shows the molar mass distributions of TOFA-lignins. The upper image shows the SEC analysis in THF for TOFA_L_100, Mn4004, Mw 46,068, polydispersity (Mw/Mn) 11,507 and the lower image shows the SEC analysis in THF for TOFA_L_50, Mn 4,661, Mw: 26,556, polydispersity (Mw/Mn): 5,697.

Figure 7:
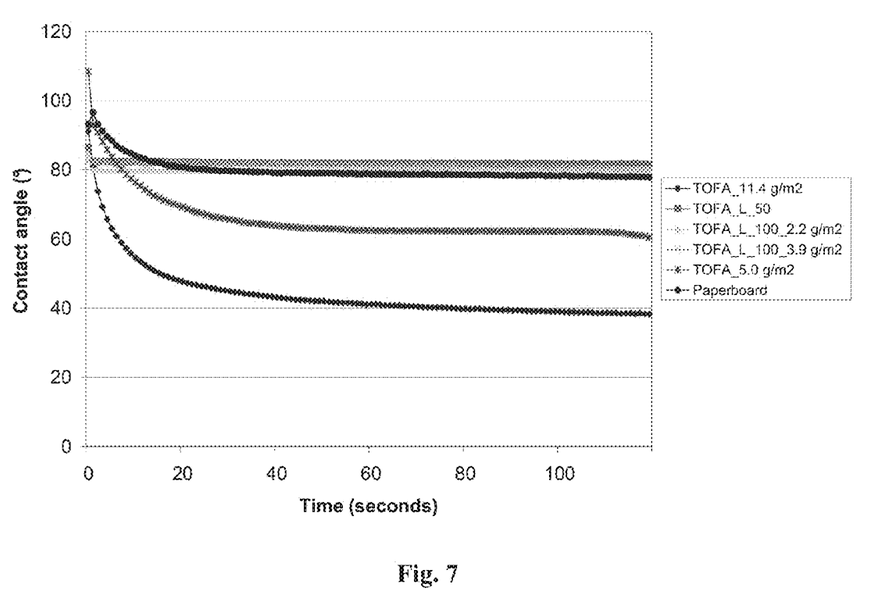
FIG. 7 shows the FTIR spectra of SW kraft lignin, TOFA_L_50 and TOFA_L_100, normalized to the aromatic lignin band at about 1510 cm$^{-1}$.
Figure 8A:
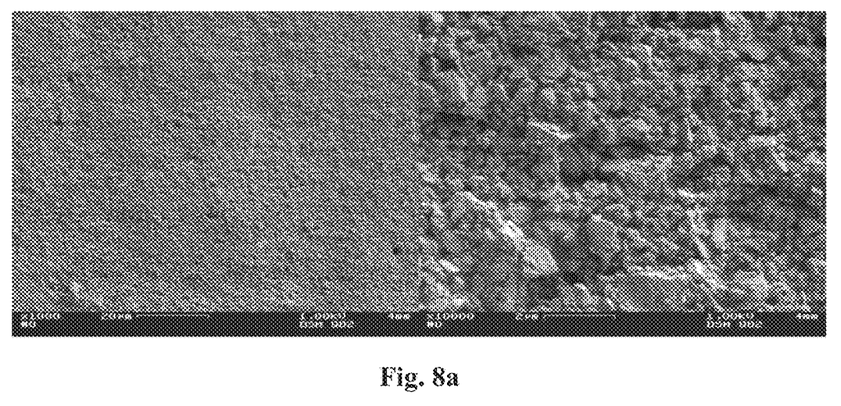
FIG. 8 shows the contact angle measurements as a measure of surface hydrophobicity.
Figure 8B:
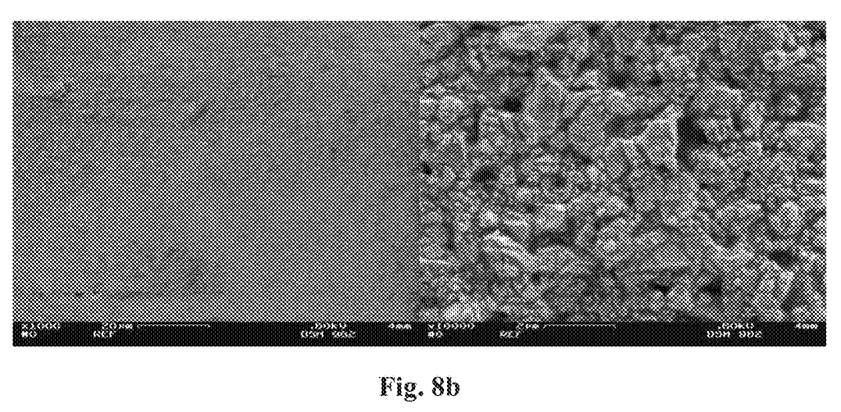
Figure 8C:
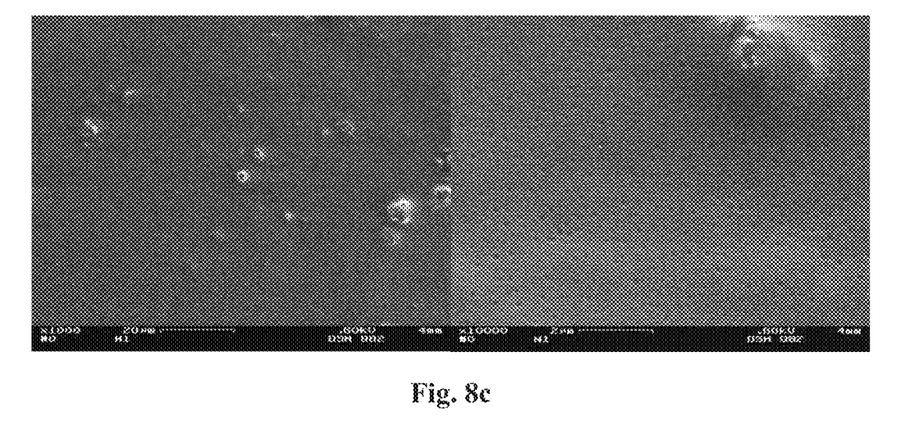
Figure 8D:
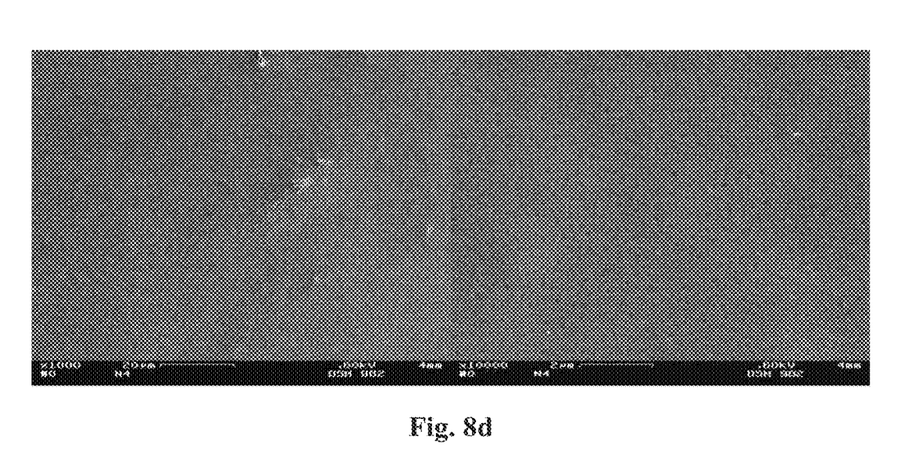

FIG. 7 shows the FTIR spectra of SW kraft lignin, TOFA_L_50 and TOFA_L_100, normalized to the aromatic lignin band at about 1510 cm$^{-1}$.

Tensile Strength

The tensile strength was determined for the paperboard and the coated paperboard samples (TOFA, TOFA_L_50 and TOFA_L_100). As can be seen in Table 4, the paperboard and all the coated paperboard samples exhibit a similar tensile strength which means that the coating does not affect the tensile strength of the paperboard.

TABLE 4

The tensile strength for the paper board and coated paper board samples

| Sample | Coat weight (g/m$^2$) | Tensile strength (kN/m) |
|---|---|---|
| Paper board | — | 10.8 (0.3) |
| TOFA | 5.0 (±2.8) | 10.7 (0.2) |
| TOFA | 11.4 (±3.5) | 10.3 (0.5) |
| TOFA_L_50 | 9.8 (±2.6) | 11.2 (0.5) |
| TOFA_L_100 | 2.2 (±0.8) | 10.9 (0.3) |
| TOFA_L_100 | 3.9 (±1.0)$^{x)}$ | 10.9 (0.6) |

$^{x)}$Double coating

Table 5 gives the aroma barrier data:

TABLE 5

Aroma barrier data of TOFA and TOFA functionalized lignin

| | Coating thickness | Isoamyl acetate | Limonene | Cis-3-hexenol | Carvone |
|---|---|---|---|---|---|
| TOFA-lignin (100%) | 2.8 µm | 3.16 * 10$^{-15}$ | 3.53 * 10$^{-15}$ | 4.93 * 10$^{-15}$ | 3.02 * 10$^{-15}$ |
| TOFA | 9.0 µm | 15.6 * 10$^{-15}$ | 19.69 * 10$^{-15}$ | 33.55 * 10$^{-15}$ | 29.2 * 10$^{-15}$ |

<10 * 10$^{-15}$: good,
1-10 * 10$^{-15}$: medium,
>10 * 10$^{-15}$: poor
TOFA-functionalised lignin has medium aroma barrier properties whereas TOFA has poor.

The reduction in OTR may be interpreted in terms of closure of surface pores of the paperboard (REF).

In fact, a material is defined as high oxygen barrier if OTR is less than 3 cm$^3$/m$^2$×24 h (at 25° C., 50% RH) for a 25 µm thick film. Even though a reduction in OTR is observed for the coating materials investigated, the values are not low enough to be regarded as a "high oxygen barrier", which probably can be explained by the fact that a homogeneous and continuous film was not fully formed.

Figure 5:
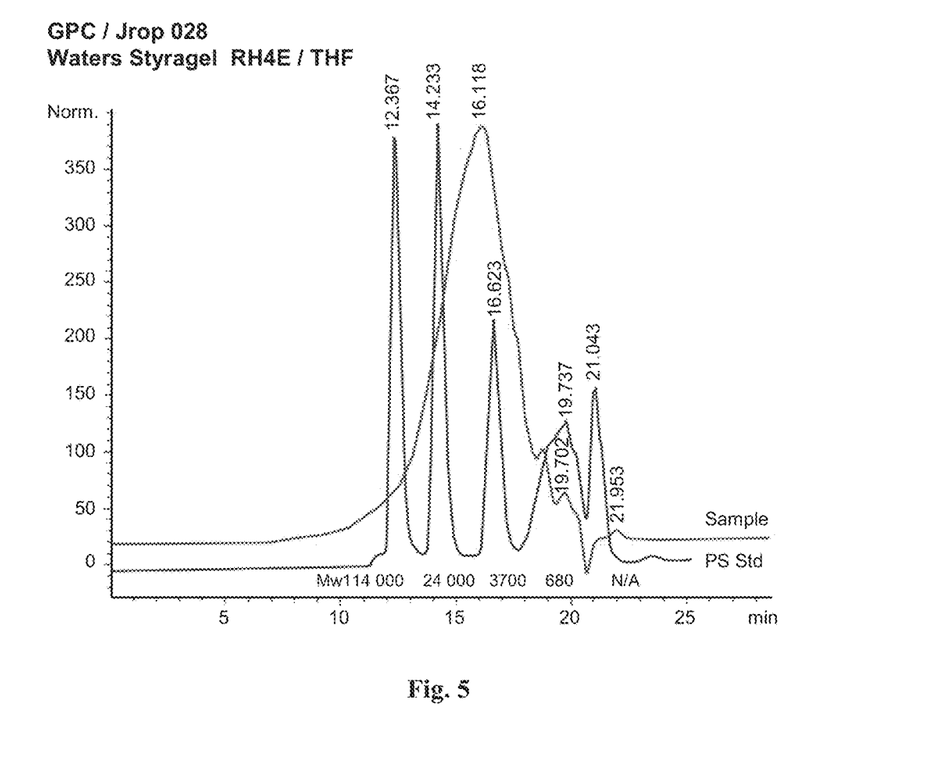
FIG. 5 shows FE-SEM images of the surface of a) paperboard b) TOFA coating with a coat weight of 5 g/m² c) TOFA_L_50 coating and d) TOFA_L_100 coating with a coat weight of 3.9 g/m²—magnification 1000× for the left hand images, and 10,000× for the right hand images.

In FIG. 5, the SEM images of TOFA coating with a coat weight of 5.0 g/m$^2$, TOFA_L_50 coating and TOFA_L_100 with a coat weight of 3.9 g/m$^2$ is shown. As can be seen on the higher magnification images (10000×), the SEM images reveal slight inhomogeneities of the film for the TOFA_L_50 and TOFA_L_100 (3.9 g/m$^2$) coatings. Since TOFA has a transparent colour it is difficult to evaluate the coating quality since basically the underlying board is visible. Even if the dimensions of the inhomogeneities are As will appear from the above, commercially available lignin (exemplified by Indulin AT) can be esterified with tall oil fatty acid to different degree of substitution and used for barrier application in fiber-based packaging materials.

The products obtained, the functionalized lignin material, contained both reacted and unreacted TOFA.

Paperboards coated with TOFA functionalized lignin exhibit a significant reduction in water vapour transmission rate and oxygen transmission rate.

The novel TOFA functionalized lignin coating material can be exploited as sustainable barrier material, thereby replacing the conventional petroleum based barrier material.

Although the above description discusses the use of fatty acids contained in TOFA compositions, it is clear that there are also some rosin acids (typically less than 10% by mass, in particular 5% by mass or less) present in the TOFA. These acids may also, to some extent, take part in the reaction with the hydroxyl groups of the lignin.

TABLE 6

WVTR and OTR of lignin palmitate (C16), laurate (C12) and TOFA-ester coated paperboard normalized to coat weight of 10 g/m². (TOFA-L-100: all hydroxyl groups esterified; TOFA-L-50: 50% of the total hydroxyl groups esterified)

| Sample | WVTR (g/m² × 24 h) | OTR (cm³/m² × 24 h) |
|---|---|---|
| Paperboard | 740 | >400 000 |
| SW palmitate | 122 | 24200 |
| SW laurate | 238 | 62900 |
| SW palmitate, double coated | 156 | 31400 |
| SW laurate, double coated | 216 | 55000 |
| HW palmitate | 118 | 1500 |
| HW laurate | 243 | 59100 |
| HW palmitate, double coated | 42 | 1800 |
| HW laurate, double coated | 234 | 55200 |
| SW TOFA L-50 | 529 | 42300 |
| SW TOFA L-100 | 110 | 8300 |
| SW TOFA L-100, double coated | 101 | 9200 |
| PLA (extrusion coated paperboard) | 300 | — |

As will appear from the results, the TOFE modified lignin is at least as good, or even better, with regard to WVTR as the extructions coated PLA used for reference.

FIG. 8 shows the contact angle measurements as a measure of surface hydrophobicity.

Figure 9:
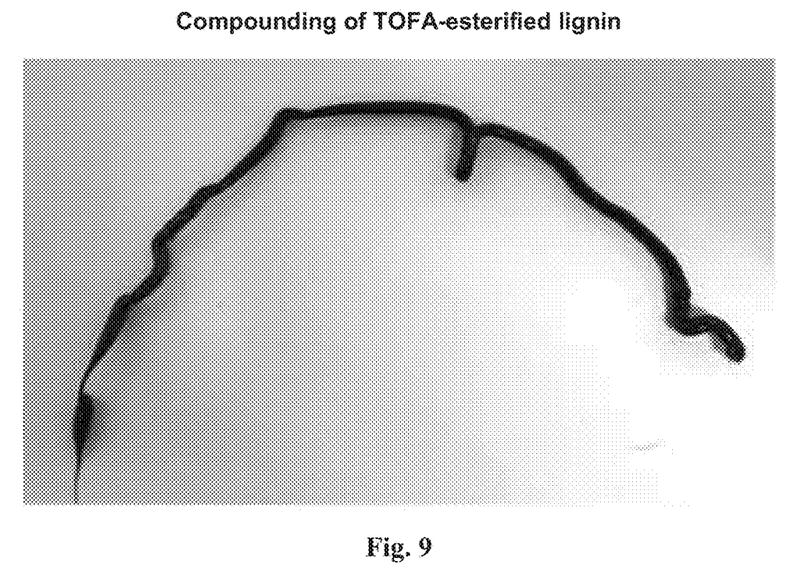
FIG. 9 shows a compounded TOFA-esterified lignin straw.

FIG. 8 indicates that a board coated with TOFA-lignin (both samples) has a high contact angle and it is stable as a function of time. A board coated with TOFA as such has a contact angle which is not stable, which may be attributed to porosity; and FIG. 9 shows that a continuous straw could be produced from TOFA-esterified lignin. In the present case, no plasticizing was needed. Compounding was carried out at 80° C. at a stirring rate of 150 rpm. The straw shown in FIG. 9 was soft and elastic even at room temperature.

The invention claimed is:

1. Modified lignin obtained by modifying lignin derived from: a kraft process, a soda cooking process, a polysulphide cooking process or an organosolv process comprising esterifying at least a part of the hydroxyl groups present in the lignin with a tall oil fatty acid composition, wherein the tall oil fatty acid composition contains at least 80% by mass, calculated from the total solid matter, of fatty acids having 18 carbon atoms.

2. The modified lignin according to claim 1, wherein at least a part of the tall oil fatty acids contains unsaturation.

3. Method of modifying lignin comprising esterifying at least a part of the hydroxyl groups present in the lignin with a tall oil fatty acid composition, wherein the lignin is derived from a kraft process, a soda cooking process, a polysulphide cooking process or an organosolv process and wherein the tall oil fatty acid composition contains at least 80% by mass, calculated from the total solid matter, of fatty acids having 18 carbon atoms.

4. The method according to claim 3, wherein the tall oil fatty acid composition comprises mixtures of unsaturated C18 fatty acids.

5. The method according to claim 3, wherein at least a part of the hydroxyl groups present in lignin are esterified with acids present in the tall oil fatty acid fraction (TOFA).

6. The method according to claim 3, wherein the hydroxyl groups are esterified with fatty acids and optionally rosin acids.

7. The method according to claim 3, wherein at least a part of the acids used for esterification contain unsaturation.

8. The method according to claim 3, wherein a tall oil fatty acid composition is used for esterification, comprising $C_{16}$ to $C_{20}$ fatty acids, at least a part of which are formed by fatty acids containing 2 and optionally 3 double bonds.

9. The method according to claim 3, wherein the lignin comprises phenolic hydroxyl groups, aliphatic hydroxyl groups or a combination thereof.

10. The method according to claim 3, wherein at least 50% of the hydroxyl groups are esterified.

11. The method according to claim 3, wherein the tall oil fatty acid composition contains 0.1 to 10% rosin acids calculated by weight of the solid matter of the composition.

\* \* \* \* \*